Patented Sept. 4, 1928.

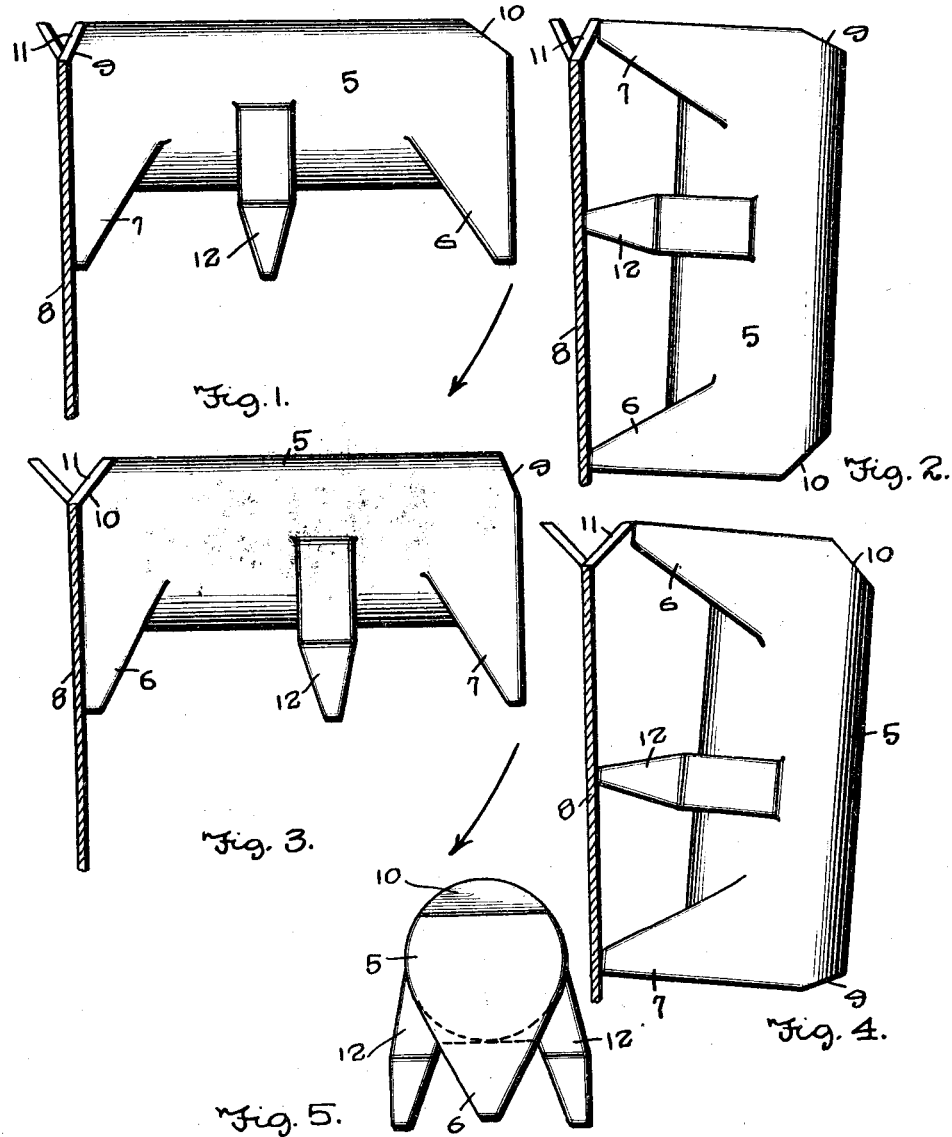

1,683,174

UNITED STATES PATENT OFFICE.

CARL EYRISH, OF GIG HARBOR, WASHINGTON.

SAW-SETTING ANVIL AND GAUGE.

Application filed November 16, 1925. Serial No. 69,471.

This invention relates to improvements in devices for facilitating setting and gauging of the teeth of cross cut saws and has particular reference to a device of this kind known as a saw setting anvil and gauge.

The primary object of the invention is to provide a device of the above kind which is extremely simple and durable in construction as well as efficient in operation.

A further object is to provide a device of the above kind which may be readily and conveniently employed for effecting setting of the teeth of a cross cut saw at either of two angles relative to the saw blade to adapt the saw to make a fine or coarse cut, and which may be conveniently employed to gauge the teeth so as to determine whether or not the same are set at the proper angle in each instance.

Another object is to generally simplify and improve devices of the above kind whereby the same may meet with all of the requirements for a successful commercial use.

Other objects will appear as the nature of the invention is better understood, and the same consists in the novel form, combination and arrangement of parts hereinafter more fully described, shown in the accompanying drawing and claimed.

In the drawing, wherein like reference characters indicate corresponding parts throughout the several views, Figure 1 is a side elevational view of a saw setting anvil and gauge constructed in accordance with the present invention and operatively disposed with respect to a saw blade for effecting setting of the teeth at an angle for fine adjustment or setting thereof.

Figure 2 is a view similar to Figure 1 illustrating the anvil and gauge positioned for gauging the set of the teeth when set by using the tool as illustrated in Figure 1.

Figure 3 is a view similar to Figure 1 illustrating the tool employed for effecting setting of the saw teeth at another angle for securing a coarse adjustment or setting of the teeth.

Figure 4 is a view similar to Figure 2 illustrating the tool in use for gauging the set of the saw teeth when set by using the tool as illustrated in Figure 3, and Figure 5 is an end elevational view of the tool or anvil and gauge illustrated in Figures 1 to 4 inclusive.

Referring more in detail to the drawing, the present invention embodies an elongated solid metallic body 5 having integral gauge lugs or points 6 and 7 which are of similar form and project laterally in the same direction from opposite end portions of the body 5 as clearly illustrated. The outer sides of the gauge points 6 and 7 and the major portions of the end surfaces of the body 5 provide relatively large flat bearing surfaces adapted to flatly engage a side of the saw blade 8 as illustrated in Figures 1 and 3 when the device is employed in setting the saw teeth, and the ends of the body have relatively small beveled surfaces 9 and 10 which are disposed at different angles relative to the longitudinal axis of the body 5 and the planes of the respective flat end surfaces of the body.

It is thus apparent that when the device is disposed as shown in Figure 1 with the outer side of the gauge contact point 7 and the corresponding end of the body 5 flatly contacting a side of the saw blade 8, and the beveled surface 9 opposing the saw tooth 11 to be set, said tooth may be set at an angle relative to the saw blade by striking the same with a hammer so as to cause the tooth to bend laterally against the beveled surface 9. As the beveled surface 9 is at a less acute angle to the longitudinal axis of the body 5 than the beveled surface 10, this use of the tool will effect setting of the saw teeth at a fine set or adjustment which is most desirable when employing the saw for sawing dry wood. By turning the device end for end so as to dispose the outer side of the gauge point 6 and the corresponding end of the body 5 against the side of the saw blade as shown in Figure 3, the saw teeth 11 may be bent laterally into contact with the beveled surface 10 for securing a coarse set or adjustment of the saw teeth. This coarse set of teeth is had by reason of the fact that the beveled surface 10 is disposed at a more acute angle to the longitudinal axis of the body 5 than the beveled surface 9, and such coarse setting of the teeth is desirable when employing the saw for sawing wet or green lumber.

A further pair of transversely aligned spaced gauge points 12 are rigid and preferable integral with the body 5 and project laterally from the latter in the same general direction as the gauge points 6 and 7. The gauge points 12 are slightly longer than the gauge points 6 and 7 so as to project outwardly beyond the plane of the ends of the gauge points 6 and 7, and said gauge points 12 are further disposed nearer the gauge point 7 than the gauge point 6 or to one side of the transverse center of the body 5 as clearly shown and for a purpose which will presently be made apparent.

By reason of the fact that the gauge points 12 are longer than the gauge points 6 and 7 and disposed nearer to the gauge point 7 than the gauge point 6, it is possible to employ the device for gauging both the set of the teeth as shown in Figures 1 and 2 or the set of the teeth as shown in Figures 3 and 4. For gauging the set of the teeth when set as illustrated in Figure 1, the tool is simply swung downwardly as indicated by the arrow so as to assume the position as shown in Figure 2 wherein the gauge points 6 and 12 bear against the adjacent side of the saw blade and the gauge point 7 is disposed to engage the free end of the set tooth being gauged when the latter is properly set against the anvil face 9. In a like manner, to gauge the teeth when set as illustrated in Figure 3, it is merely necessary to swing the tool downwardly as indicated by the arrow in the latter figure so that the tool assumes a position as illustrated in Figure 4. When thus positioned, the contacts 7 and 12 will engage the side of the saw blade and the gauge contact 6 will be disposed to contact the point of the set tooth when the latter has been properly set against the anvil face 10.

From the above description it will be apparent that when the tool is employed for setting saw teeth at the desired angle, such tool may be readily positioned for gauging the teeth so set with a minimum amount of effort irrespective of which angle of setting is employed.

In view of the fact that the points 12 are disposed nearer to the point 7 than to the point 6, the tool will assume an inclined position as shown in Figure 4 at a greater angle to the saw blade than when positioned as shown in Figure 2, whereby the gauging of the teeth in either instance is permitted.

The rounded form of the body 5 presents no corners to cause discomfort when gripped in the hand, and by reason of the fact that the contact points 12 are integral or rigid with the body 5, there is no possibility of their displacement with relation to the body or to the contact points 6 and 7. This is also true with respect to the contact points 6 and 7 which are rigid or integral with the body 5, and continued accurate setting and gauging of teeth is insured.

It is believed that the construction and operation as well as the advantages of the present invention will be readily understood and appreciated by those skilled in the art.

What I claim is new is:

A saw-tooth setting anvil and gauge comprising an elongated anvil body having parallel end faces and provided at its opposite ends and at one side with anvil faces inclined at relatively different angles with respect to the respective end faces of the body and of different lengths, gauge points projecting from the other side of the body at the ends thereof with their relatively remote sides in a common plane with the respective end faces of the body, and another gauge point projecting from the last mentioned side of the body and of greater length than the first mentioned gauge point and located nearer that end of the body at which the less inclined and shorter anvil face is located.

In testimony whereof I affix my signature.

CARL EYRISH.